Figure 1:
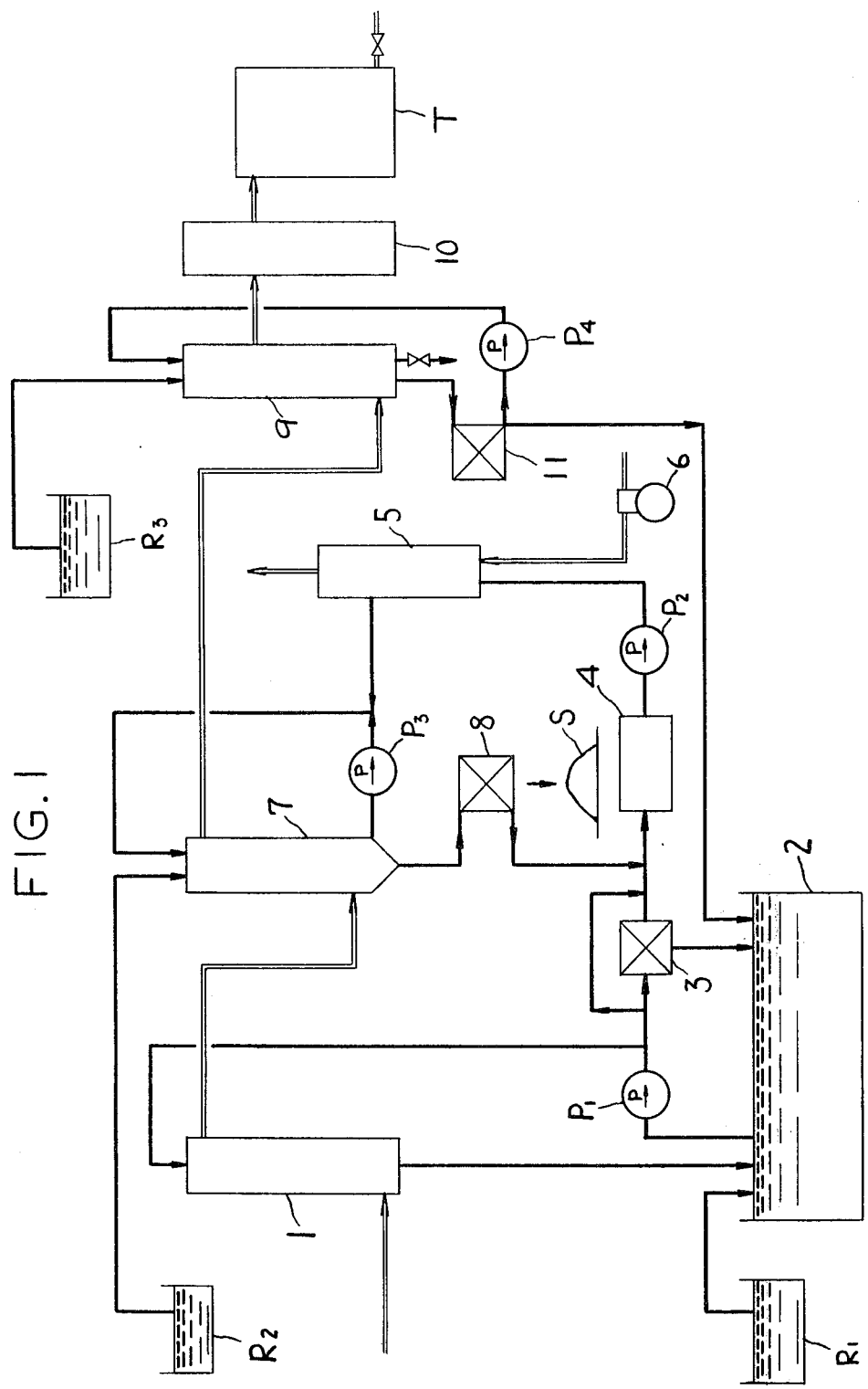

United States Patent [19]
Ooka et al.

[11] 3,953,577
[45] Apr. 27, 1976

[54] PROCESS FOR PURIFYING GASES CONTAINING HCN

[75] Inventors: Isami Ooka, Neyagawa; Noboru Tomihisa, Nishinomiya; Yoshio Nogami, Suita; Katuo Katagiri, Takarazuka, all of Japan

[73] Assignee: Osaka Gas Company, Limited, Osaka, Japan

[22] Filed: Dec. 27, 1972

[21] Appl. No.: 318,749

[30] Foreign Application Priority Data
Dec. 30, 1971  Japan............................ 46-1739

[52] U.S. Cl............................. 423/236; 423/226; 423/237; 423/313; 423/396; 423/470; 423/546
[51] Int. Cl.².................... C01C 3/04; C01C 1/247
[58] Field of Search........... 423/546, 313, 396, 470, 423/571, 225, 230, 232, 233, 236, 237

[56] References Cited
UNITED STATES PATENTS

| | | | |
|---|---|---|---|
| 1,148,368 | 7/1915 | Evans | 423/546 |
| 1,924,206 | 8/1933 | Hansen | 423/236 |
| 1,932,819 | 10/1933 | Hansen | 423/546 |
| 1,986,899 | 1/1935 | Sperr, Jr. | 423/547 |
| 2,621,108 | 12/1952 | Hill | 423/366 |
| 2,819,950 | 1/1958 | Patton | 423/573 L |

FOREIGN PATENTS OR APPLICATIONS

| | | | |
|---|---|---|---|
| 1,669,327 | 10/1969 | Germany | 423/236 |
| 711,170 | 6/1965 | Canada | 423/224 |
| 530,876 | 1/1922 | France | 423/546 |

*Primary Examiner*—Oscar R. Vertiz
*Assistant Examiner*—Gary P. Straub
*Attorney, Agent, or Firm*—Larson, Taylor and Hinds

[57] ABSTRACT

Gases containing hydrogen cyanide, ammonia and hydrogen sulfide are purified by first washing the gas with a suspension of solid sulfur to fix the hydrogen cyanide as ammonium thiocyanate and ammonium thiosulfate. The resulting suspension is then subjected to a wet-oxidation wherein the thiosulfate and a part of the thiocyanate is converted into sulfuric acid and ammonium sulfate afterwhich the resulting liquid containing unreacted thiocyanate is decomposed into an ammonium salt and is recovered from the oxidation and decomposition steps.

14 Claims, 2 Drawing Figures

PROCESS FOR PURIFYING GASES CONTAINING HCN

This invention relates to a process for purifying gases, more particularly to an improved process for effectively removing impurities from gases, especially for removing hydrogen cyanide, ammonia and hydrogen sulfide therefrom.

The impurities, especially hydrogen cyanide, ammonia and hydrogen sulfide contained in various fuel gases and exhaust gases (hereinafter referred to briefly as "gas" or "gases") cause environmental destruction through the pollution of the atmosphere, water, etc. and give rise to corrosion in devices for supplying and burning gases. Accordingly various methods have heretofore been conducted to purify gases by recovering and removing these impurities therefrom.

As the most common method conventionally known, gases are purified by recovering hydrogen sulfide in the form of colloidal sulfur through desulfurization process by washing gases with an aqueous solution of desulfurizing catalyst, reacting ammonia with an inorganic acid such as sulfuric acid, phosphoric acid, etc. to recover the same as ammonium salts thereof and removing hydrogen cyanide by washing with water. According to this method, however, it is still impossible to effectively recover and remove hydrogen cyanide from the waste washing, so that the waste washing is directly discharged as an effluent, causing water pollution. Thus the method fails to meet the stringent regulations presently adopted to control the quality of water.

A process for purifying gas containing hydrogen cyanide, ammonia and hydrogen sulfide has been developed in which gas is washed with an alkaline aqueous solution containing sulfur suspended therein to fix hydrogen cyanide as thiocyanate such as ammonium thiocyanate. Thereafter the gas is brought into contact with inorganic acid to remove ammonia therefrom and then washed with an aqueous solution of desulfurizing catalyst to remove hydrogen sulfide. Although this process has eliminated air pollution or water pollution caused by hydrogen cyanide discharged from the conventional gas purification system, an effective method is still unavailable for treating a large amount of the resulting thiocyanate. For example, thiocyanate may be oxidized into sulfuric acid and ammonium sulfate, but it is extremely difficult to completely decompose thiocyanate and, unless oxidation decomposition is effected completely, unreacted thiocyanate will cause water pollution when discharged. Complete oxidation decomposition of thiocyanate requires greatly increased temperature and pressure, inevitably creating rapid and marked corrosion of the oxidation apparatus under high temperature and pressure. In the case where a material having high corrosion resistance is used to avoid corrosion of the apparatus, the apparatus becomes very costly, hence infeasible. For these reasons, it is desired to develop a novel process for purifying gas to remove and recover hydrogen cyanide from the gas in such form as to cause no environmental pollution.

A main object of this invention is to provide a process for effectively removing hydrogen cyanide, ammonia and hydrogen sulfide from gases.

Another object of this invention is to provide a process for recovering hydrogen cyanide, ammonia and hydrogen sulfide from gases in a useful form.

Still another object of this invention is to provide a process for removing hydrogen cyanide, ammonia and hydrogen sulfide from gases with simple procedures free from undesired corrosion of the apparatuses.

These and other objects of this invention will become more apparent from the following description.

In purifying gas containing hydrogen cyanide, ammonia and hydrogen sulfide by subjecting the gas to steps of removing hydrogen cyanide, ammonia and hydrogen sulfide, the present process is characterized in that said step of removing hydrogen cyanide is conducted by:

1. washing the gas with a suspension of solid sulfur to fix hydrogen cyanide as ammonium thiocyanate and ammonium thiosulfate and separate the same from the gas,
2. blowing air into the resulting suspension containing the thiocyanate and the thiosulfate with heating to oxidize the thiosulfate and a part of the thiocyanate into sulfuric acid and ammonium sulfate,
3. contacting the liquid obtained from said step (2) and containing unreacted thiocyanate with an inorganic acid to decompose it into an ammonium salt of the inorganic acid, and
4. recovering the ammonium salt resulting from said steps (2) and (3).

According to the extensive researches of the present inventors, it has been found that when hydrogen cyanide contained in the gas is fixed as ammonium thiocyanate and the resulting ammonium thiocyanate is subjected to two steps of oxidation and decomposition, i.e., to wet-oxidation and subsequent decomposition with an inorganic acid, the thiocyanate is easily converted into sulfuric acid and ammonium salt of the inorganic acid used, whereby the hydrogen cyanide in the gas is completely removed and recovered with simple procedures free from any water pollution. In wet-oxidation step of the invention there is no need to decompose ammonium thiocyanate completely but it is only necessary to decompose it partially under mild temperature and pressure conditions. The ammonium thiosulfate produced in the step (1) can be completely decomposed in this oxidation step, since it is far more reactive than ammonium thiocyanate. The unreacted ammonium thiocyanate can be easily decomposed by subsequent decomposition step, i.e., by contacting it with an inorganic acid, to recover the same as a useful ammonium salt of inorganic acid. Thus the present invention has made it possible for the first time to remove hydrogen cyanide from the gas without discharging harmful substances from the system and without resulting in the corrosion of the oxidation apparatus.

In accordance with the present process ammonia and hydrogen sulfide contained in the gas can be removed in the conventional manner. For example, ammonia can be removed by contacting the gas with an inorganic acid such as sulfuric acid, phosphoric acid, etc. Hydrogen sulfide can be removed, for example, by washing the gas with an aqueous solution of desulfurizing catalyst such as picric acid, hydroquinone, etc. This washing step can be conducted after removing steps of hydrogen cyanide and ammonia but it is preferable to carry out it simultaneously in the removing step of hydrogen cyanide. That is to say, when the gas to be purified is first brought into contact with water having dissolved therein a desulfurizing catalyst, hydrogen sulfide contained in the gas is converted into sulfur to produce aqueous suspension thereof and hydrogen cyanide is converted into thiocyanate and thiosulfate with the reaction with the sulfur suspension thus produced.

The gases to be purified by this invention include various gases containing hydrogen cyanide, ammonia and hydrogen sulfide. Usually, fuel gases, particularly those obtained by coking of coal and cracking of oil, and waste gases from various industries contain these impurities, so that these gases can effectively be purified by the process of the invention.

According to this invention the gas containing hydrogen cyanide, ammonia and hydrogen sulfide is first washed with a suspension of solid sulfur, whereby hydrogen cyanide, part of ammonia are fixed as ammonium thiocyanate and ammonium thiosulfate. The reaction to produce ammonium thiocyanate is shown by the following equations.

$$HCN + NH_3 \rightarrow NH_4CN$$

$$2NH_3 + H_2S + xS \rightarrow (NH_4)_2S_{x+1}$$

$$NH_4CN + (NH_4)_2S_{x+1} \rightarrow (NH_4)_2S_x + NH_4SCN$$

$$(NH_4)_2S_x + S \rightarrow (NH_4)_2S_{x+1}$$

Washing may be conducted by flowing the gas and liquid countercurrently or in the same direction, by bubbling the gas into the liquid with agitation or by like conventional method. The suspension may have a pH of at least 7.5, preferably of 8 to 10, but it is not necessary to positively adjust the initial pH of the suspension, inasmuch as part of ammonia contained in the gas will dissolve into the suspension to give progressively increasing pH.

The concentration of the solid sulfur in the suspension may be 0.1 to 50 g/l, preferably 10 to 20 g/l. It is desired that the solid sulfur be as small as possible in its particle size, and especially good results will be achieved with colloidal sulfur not more than 10 $\mu$ in particle size.

As hydrogen cyanide and part of ammonia get progressively fixed as ammonium thiocyanate and ammonium thiosulfate during the washing of gas, the solid sulfur in the suspension will be consumed, so that sulfur may be supplied as required. The solid sulfur may be supplied from outside the system, but it is very advantageous and economical from the viewpoint of material balance to add colloidal sulfur to the washing liquid which sulfur is recovered from the desulfurization step included in the gas purifying process, or to add a desulfurizing catalyst to the washing liquid so as to effect desulfurization of the hydrogen sulfide in the gas at the same time with the fixation of hydrogen cyanide. Thus recovered sulfur may be directly utilized as the sulfur component of the washing liquid. Examples of the desulfurizing catalyst are aromatic polynitro compounds such as picric acid, metanitrophenol, 1,3,5,-trinitrobenzoic acid, 1,3-dihydroxy-2,4,6-trinitrobenzene and the like, aromatic polyoxy compounds such as hydroquinone, 2,6- or 2,7-anthraquinone disulfonic acid, 1,4-naphthoquinone-2-sulfonic acid, etc.

For oxidation treatment, air is then contacted, with heating, with the solid sulfur suspension resulting from the washing step and containing ammonium thiocyanate and ammonium thiosulfate. From the viewpoint of decomposition efficiency, the temperature may be not lower than 180° C, but the preferable temperature is 180° to 230° C to prevent corrosion of the apparatus. The reaction pressure which is dependent on saturated vapor pressure at the reaction temperature is usually set at 10 to 150 kg/cm²G. The amount of air required is at least equivalent of the components to be oxidized and is governed by the desired degree to which the components of the suspension to be oxidized are decomposed, but is preferably 1 to 2 equivalents of the components to be oxidized from the economical viewpoint. The reaction is conducted by flowing the air and liquid countercurrently or in the same direction, by blowing the air into the liquid with agitation or by like method already known. Through the above oxidation step, nearly all the amount of ammonium thiosulfate and about 50 to 70 % of ammonium thiocyanate are oxidized and decomposed to sulfuric acid and ammonium sulfate, although the results may vary depending on the reaction temperature and pressure, on the method for blowing air as well as on the amount of the air.

Subsequently, the reaction mixture resulting from the oxidation decomposition and containing unreacted ammonium thiocyanate is contacted with inorganic acid so as to decompose the ammonium thiocyanate to ammonium salt of the inorganic acid. The ammonium sulfate produced by the oxidation decomposition and ammonium salt produced by the decomposition with acid are separated from the resulting mixture for recovery. Examples of the inorganic acid to be used are various acids such as sulfuric acid, phosphoric acid, nitric acid, hydrochloric acid and the like, among which sulfuric acid and phosphoric acid are particularly preferable. Depending on the kind of acid used, ammonium sulfate, ammonium phosphate, ammonium nitrate, ammonium chloride, etc. will be formed. The concentration of the acid is determined in accordance with the amount of unreacted ammonium thiocyanate. The higher the concentration, the more rapidly will the ammonium thiocyanate be decomposed. It is usually 2 to 50% by weight. The higher the reaction temperature, the more rapidly the decomposition proceeds. The temperature is usually at least 40° C, preferably 50° to 70° C.

Thus hydrogen cyanide contained in the gas is completely removed therefrom and recovered as sulfuric acid and ammonium salt or inorganic acid through ammonium thiocyanate.

The gas from which hydrogen cyanide has been removed is then subjected to steps of removing ammonia and hydrogen sulfide in the conventional manner. The ammonia removing step is usually conducted at an acid concentration of about 3 to 7 wt.% and a reaction temperature of about 40° to 60° C. For advantageous operation according to this invention, the reaction mixture resulting from the wet-oxidation decomposition and containing unreacted ammonium thiocyanate is led to the above ammonia removing step so as to remove ammonia from gas and decompose unreacted ammonium thiocyanate. The desulfurization of the gas is conducted after the removing of hydrogen cyanide and ammonia or at the same time with the removing of hydrogen cyanide as mentioned before. This desulfurization is carried out by contacting the gas with an aqueous solution containing a desulfurizing catalyst. If necessary, the gas may be finally subjected to the desulfurization in order to remove small amount of hydrogen sulfide resulting from the decomposition of ammonium thiocyanate in the wet-oxidation and decomposition with an inorganic acid. The sulfur recovered in the desulfurization step can be used as solid sulfur in the removing of hydrogen cyanide as mentioned before.

Figure 2:
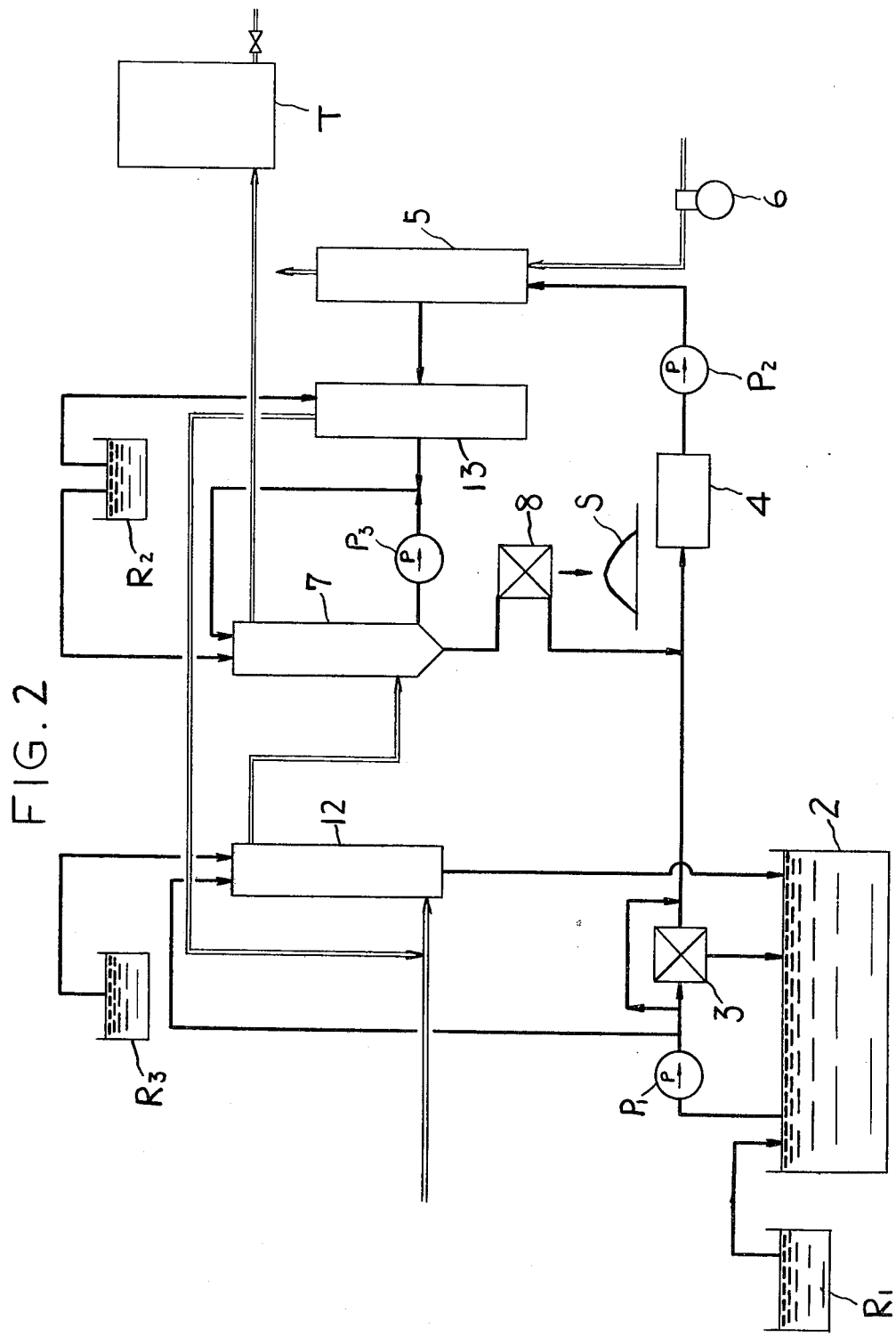

For a better understanding of the advantages of the present invention, the present method will be described below with reference to the attached drawings, in which FIGS. 1 and 2 are flow diagrams showing different modes of practicing this invention.

Gas containing HCN, NH$_3$ and H$_2$S is supplied to an absorption tower 1 of the gas-liquid countercurrent type, where the gas is washed with a recycling suspension of sulfur particles from a tank 2 to fix HCN in the form of NH$_4$SCN. Since the ability of the suspension to fix HCN is reduced corresponding to the increase of the concentration of NH$_4$SCN and NH$_4$)$_2$S$_2$O$_3$ in the suspension, part of the suspension may preferably be discharged from the tank 2, with a fresh sulfur suspension supplied from a tank R$_1$. The discharged suspension is sent by way of a pump P$_1$ to a filter 3, where great part of sulfur is separated off. The liquid is then sent to a tank 4. The separated sulfur may be sent back to the tank 2 for reuse. The suspension discharged may be caused to bypass the filter 3 to convert the unrecovered sulfur directly to sulfuric acid in the subsequent oxidation decomposition step so that the acid can be favorably utilized in the ammonia removing step. By means of a pump P$_2$, the suspension containing NH$_4$SCN, (NH$_4$)$_2$S$_2$O$_3$ and solid sulfur is sent from the tank 4 to oxidation decomposition means 5, where it is brought into contact with air supplied from a compressor 6 with heating. In the oxidation decomposition means 5 almost all amounts of (NH$_4$)$_2$S$_2$O$_3$ and solid sulfur and about 50 to 70% of NH$_4$SCN are oxidized with the air into (NH$_4$)$_2$SO$_4$ and H$_2$SO$_4$. After decomposition, the reaction mixture is led to a reactor 7 to come into contact with a solution of inorganic acid from a tank R$_2$, whereby unreacted substances principally comprising NH$_4$SCN are decomposed. In the case where H$_2$SO$_4$ is used as the inorganic acid, NH$_4$SCN will be decomposed as represented by the following equations:

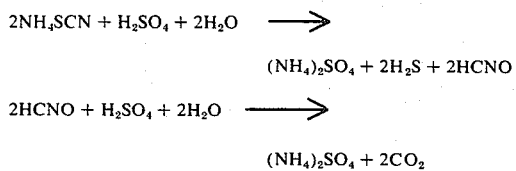

As an advantageous device to be used for the reactor 7, an ammonia saturator may be used which is employed for removing hydrogen sulfide from gases. If, however, it is difficult to effect complete decomposition of NH$_4$SCN only by the ammonia saturator, one or more reactors may be additionally used. Part of the inorganic acid-containing liquid discharged from the reactor 7 is returned to the reactor 7 again by means of a pump P$_3$ so as to be reused for the decomposition of NH$_4$SCN. The liquid containing high contents of (NH$_4$)$_2$SO$_4$ produced in the oxidation decomposition means 5 and ammonium salt of inorganic acid produced in the reactor 7 is discharged from the bottom of the reactor 7 and fed for example to a centrifugal separator 8 to collect (NH$_4$)$_2$SO$_4$ produced in oxidation decomposition means 5 and ammonium salt of inorganic acid produced in the reactor 7. Ammonium salts thus separated are shown at S. The resulting liquid is sent back to the tank 4 if unreacted NH$_4$SCN, (NH$_4$)$_2$SO$_4$ and ammonium salt of inorganic acid still remain in the liquid.

The gas discharged from the absorption tower 1 where HCN has been remove therefrom is introduced into the ammonia saturator by an inorganic acid as in a conventional manner, for which the reactor 7 is advantageously used and where NH$_3$ is removed from the gas in the form of an ammonium salt of inorganic acid. The gas is then subjected to desulfurization step with an aqueous solution of catalyst such as picric acid, metanitrophenol, hydroquinone, etc. from a tank R$_3$ in a conventional wet-type desulfurizer 9 and, where required, it is further led to a dry-type desulfurizer 10 where nearly complete desulfurization is achieved. The gas is then stored in a purified gas tank T. Solid sulfur recovered by the wet-type desulfurizer 9 is separated from the catalytic solution, for example, by a centrifugal separator 11 and then send back to the washing liquid tank 2 for reuse, while the catalytic solution is returned to the desulfurizer 9 through a pump P$_4$.

Another mode of practicing this invention shown in FIG. 2 is different from the system shown in FIG. 1 in that gas is washed with a suspension of solid sulfur containing a desulfurizing catalyst previously added thereto, permitting almost all of H$_2$S in the gas to be convereted to solid sulfur for direct use in the suspension simultaneously with the fixation of HCN in the gas in a contact tower 12 and that the reaction mixture resulting from oxidation decomposition means 5 is not directly introduced into the reactor 7 but into an independent contact tower 13 where ammonium thiocyanate in the mixture is subjected to decomposition by contact with an inorganic acid. In this case, particles of colloidal sulfur derived from desulfurization of gas is directly utilized in the suspension for washing the gas. The hydrogen sulfide generated through decomposition of ammonium thiocyanate within the contact tower 13 is sent to an absorption tower 12 again.

Examples of this invention will be given below, in which all percentages are by weight.

EXAMPLE 1

In a gas purifying plant shown in FIG. 1, coal gas containing 2 kg/cm$^3$ of HCN, 9 g/Nm$^3$ of NH$_3$ and 5 g/Nm$^3$ of H$_2$S was supplied at a rate of 33,000 Nm$^3$/h to a contact tower 1 of the gas-liquid countercurrent type, in which the gas was washed with 250 m$^3$/h of a aqueous solution (having an initial pH of about 7.0 which increased to 8.7 to 9.0 due to contact with the gas) containing suspended therein 1% of sulfur (recovered from a fuel gas by wet desulfurization and measuring about 2$\mu$ in particle size), whereby 175 kg/h of ammonium thiocyanate and 110 kg/h of ammonium thiosulfate were fixed in a washing liquid tank 2. Hydrogen cyanide, 20% of sulfur and 30% of ammonia were removed from the gas. The solid sulfur suspension containing ammonium thiocyanate and ammonium thiosulfate was partially discharged from the washing liquid tank 2 at a rate of 1 m$^3$/h and fed to a filter press 3 to remove sulfur. The resulting filtrate was then led to a reactor 5 of the type in which gas and liquid are passed in the same direction for contact with 500 kg of air over a period of 1 hour at a temperature of 220° C and pressure of 50 kg/cm$^2$G, whereby about 70% of ammonium thiocyanate and 99.9% of ammonium thiosulfate were decomposed to sulfuric acid and ammonium sulfate. No hydrogen cyanide was detected in the exhaust gas from the reactor 5. Total sulfur content of the exhaust gas was only 0.001 g/m³.

The reaction mixture derived from oxidation decomposition and containing sulfuric acid, ammonium sulfate and unreacted ammonium thiocyanate was continuously introduced into an ammonia saturator 7 used in a coal gas purifying apparatus, in which it was contacted with 5% sulfuric acid solution at 50°C for 30 minutes. As a result, the unreacted ammonium thiocyanate was decomposed completely. Thus 400 kg/h of ammonium sulfate was recovered, combined with that produced in the reactor 5. The ammonium sulfate recovered contained 20.9% of nitrogen, 0.1% of water and 0.12% of free acid. The amount of hydrogen sulfide resulting from the decomposition of ammonium thiocyanate in the ammonia saturator 7 accounted for 0.7 g/Nm³ of the coal gas. Along with the coal gas desulfurized in the ammonia saturator 7, the hydrogen sulfide was led to a contact tower 9 of the gas-liquid countercurrent type, where they were desulfurized with 0.1% aqueous solution of picric acid. No HCN was detected in the purified gas run off from the contact tower 9, while it contained 1 g/Nm³ of $NH_3$ and 0.001 g/Nm³ of $H_2S$.

Part of sulfur obtained from the filter press 8 and the tower 9 was returned to the washing tank 2 and used again.

EXAMPLE 2

In a gas purifying plant shown in FIG. 2, coal gas containing 1 g/Nm³ of HCN, 10 g/Nm³ of $NH_3$ and 4 g/Nm³ of $H_2S$ was supplied at a rate of 15,000 Nm³/h to an absorption tower 12, in which the gas was washed with 280 m³/h of a recycling 1% aqueous suspension (having an initial pH of about 7 which increased to about 9 to achieve equilibrium due to absorption of $NH_3$ from the gas) of finely pulverized sulfur, whereby whereby HCN, 25% of $NH_3$ and 85% of $H_2S$ in the gas were fixed as ammonium thiocyanate, ammonium thiosulfate and solid sulfur.

The suspension containing 90 g/l of ammonium thiocyanate and 65 g/l of ammonium thiosulfate was partially discharged continuously at a rate of 0.5 m³/h and fed to a filter press 3 to remove solid sulfur. The resulting filtrate was then led to wet-type oxidation means 5 of the type in which gas and liquid are passed in the same direction and retained therein at 230°C and 40 kg/cm²G for 40 minutes for contact with air supplied at 200 kg/h, whereby 70% of ammonium thiocyanate and 99.9% of ammonium thiosulfate were decomposed to sulfuric acid and ammonium sulfate. No hydrogen cyanide was detected in the exhaust gas from the means 5. Total sulfur content in the exhaust gas was 10 p.p.m.

The reaction mixture was led from the oxidation means 5 to a contact tower 13, into which 50° Be $H_2SO_4$ was continuously introduced at 50°C at a rate of 0.1 m³/h to effect contact therebetween for 20 minutes. As a result, unreacted ammonium thiocyanate was completely decomposed. Thus 200 kg/h of ammonium sulfate was recovered. The gas derived from the decomposition of $NH_4SCN$ was returned to the absorption tower 12. The ammonium sulfate recovered contained 21.0% of nitrogen, 0.1% of water and 0.11% of free acid. No HCN was detected in the desulfurized gas, while it contained 1.1 g/Nm³ of $NH_3$ and 0.001 g/Nm³ of $H_2S$.

What we claim is:

1. In purifying gas containing hydrogen cyanide, hydrogen sulfide and ammonia by subjecting the gas to processes of removing hydrogen cyanide, hydrogen sulfide and ammonia, the improvement characterized in that said process of removing hydrogen cyanide comprises a combination of steps:
   1. washing the gas with a suspension of solid sulfur in the presence of a sufficient amount of ammonia to fix hydrogen cyanide as ammonium thiocyanate and ammonium thiosulfate and separating the same from the gas,
   2. blowing air into said suspension containing the thiocyanate and the thiosulfate with heating at a temperature of 180° to 230°C to oxidize the thiosulfate and part of the thiocyanate into sulfuric acid and ammonium sulfate, the amount of said air being at least equivalent of the components to be oxidized,
   3. contacting said suspension obtained from said step (2) and containing unreacted thiocyanate with an inorganic acid added thereto to decompose it into an ammonium salt of the inorganic acid, and
   4. recovering the ammonium salt resulting from said steps (2) and (3).

2. The gas purifying process as set forth in claim 1 wherein the suspension of solid sulfur contains added thereto a desulfurizing catalyst selected from the group consisting of picric acid, metanitrophenol, 1,3,5,-trinitrobenzoic acid, 1,3-dihydroxy-2,4,6-trinitrobenzene and the like, aromatic polyoxy compounds such as hydroquinone, 2,6- or 2,7-anthraquinone disulfonic acid, and 1,4-naphthoquinone-2-sulfonic acid.

3. The gas purifying process as set forth in claim 1 wherein the concentration of the solid sulfur in the suspension is 0.1 to 50 g/l.

4. The gas purifying process as set forth in claim 3 wherein the concentration of the solid sulfur in the suspension is 10 to 20 g/l.

5. The gas purifying process as set forth in claim 1 wherein the solid sulfur in the suspension is colloidal sulfur having particle sizes of not greater than 10 μ.

6. The gas purifying process as set forth in claim 1 wherein colloidal sulfur recovered by desulfurization of a gas containing hydrogen sulfide is used as said solid sulfur in the suspension.

7. The gas purifying process as set forth in claim 1 wherein said oxidation of the thiosulfate and a part of the thiocyanate contained in the suspension into sulfuric acid and ammonium sulfate is conducted at a pressure in the range of 10 to 150 kg/cm² gauge pressure.

8. The gas purifying process as set forth in claim 1 wherein the amount of air blown into the suspension is 1 to 2 equivalents of the thiocyanate to be oxidized.

9. The gas purifying process as set forth in claim 1 wherein the inorganic acid to be used is one of sulfuric acid, phosphoric acid, nitric acid and hydrochloric acid.

10. The gas purifying process as set forth in claim 9 wherein the inorganic acid to be used is sulfuric acid.

11. The gas purifying process as set forth in claim 9 wherein the inorganic acid to be used is phosphoric acid.

12. The gas purifying process as set forth in claim 1 wherein the concentration of the inorganic acid to be added to step (3) is 2 to 50% by weight.

13. The gas purifying process as set forth in claim 1 wherein the inorganic acid to be added to step (3) has a temperature of at least 40°C.

14. The gas purifying process as set forth in claim 13 wherein the inorganic acid to be added to step (3) has a temperature of 50° to 70° C.

* * * * *